United States Patent Office 3,462,449
Patented Aug. 19, 1969

3,462,449
SUBSTITUTED 4,5,6,7-TETRAHYDRO-$\Delta^{2,\alpha}$-BENZO-
THIAZOLINEACETIC ACID ESTERS
Real Laliberte, Laval, Quebec, Canada, assignor to
American Home Products Corporation, New York,
N.Y., a corporation of Delaware
No Drawing. Filed June 13, 1967, Ser. No. 645,630
Int. Cl. C07d 91/24
U.S. Cl. 260—306.7      5 Claims

ABSTRACT OF THE DISCLOSURE

There are disclosed herein 3-substituted-4,5,6,7-tetrahydro-$\Delta^{2,\alpha}$-benzothiazolineacetic acid methyl and ethyl esters in which the substituent in position 3 may be the phenyl, the 3-nitrophenyl, 4-chlorophenyl or 3,4-dichlorophenyl group. The compounds may be further substituted in the $\alpha$-position by cyano or carbamoyl groups. The intermediate 3-phenyl-, 3-(3'-nitrophenylamino)-, 3-(4'-chlorophenylamino) and 3-(3',4'-dichlorophenylamino)-2-cyano-3-(2'-oxocyclohexyl)-thioacrylic acid methyl and ethyl esters are also disclosed.

The compounds are useful as trichomonicidal agents and methods for their preparation and use are also given.

---

This invention relates to substituted 4,5,6,7-tetrahydro-$\Delta^{2,\alpha}$-benzothiazolineacetic acid esters of the general Formula I

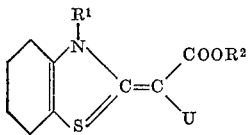

in which $R^1$ represents the phenyl, 3-nitrophenyl, 4-chlorophenyl, or the 3,4-dichlorophenyl group, $R^2$ represents a lower alkyl group containing from 1–2 carbon atoms, and U represents a nitrile group, a carbamoyl group, or hydrogen.

This invention also relates to intermediates used in the preparation of the compounds of Formula I.

The compounds of this invention inhibit the growth of Trichomonas vaginalis and are useful as trichomonicidal agents. For that purpose, they may be formulated with suitable excipients in the form of vaginal suppositories or inserts containing from 100 to 500 mg. of the active ingredient and may be administered daily for periods of time of from two to several weeks.

More specifically, the compounds of this invention are prepared by heating together in an inert solvent such as, for example, a lower alkanol, a sodium salt of a 3-arylamino-2-cyano-3-thioacrylic acid lower alkyl ester of Formula II and 2-chlorocyclohexanone of Formula III to yield the corresponding 3-arylamino-3-(2'-oxocyclohexyl)thioacrylic acid lower alkyl ester of Formula IV.

The starting material of Formula II may be conveniently prepared as described by S. Ruhemann in J. Chem. Soc., vol. 93, p. 621 (1908), by reacting together a suitable isothiocyanate of the formula $R^1NCS$ with a lower alkyl cyanoacetate of the formula $$NC—CH_2—COOR^2$$

in the presence of an alkali metal lower alkoxide, preferably sodium ethoxide, $R^1$ and $R^2$ being as defined above.

The 3-arylamino-3-(2'-oxocyclohexyl)thioacrylic acid lower alkyl esters of Formula IV may be isolated is desired. They are surprisingly active against Trichomonas vaginalis and may be also used as trichomonicidal agents in the same manner as the compounds of this invention of Formula I. Heating the compounds of Formula IV or heating the reaction mixture from which they are obtained for periods of time of from 4 to 24 hours yields the corresponding 3-aryl-2-cyano-4,5,6,7-tetrahydro-$\Delta^{2,\alpha}$-benzothiazolineacetic acid lower alkyl esters of Formula V. The latter compounds, upon treatment with sulfuric acid, yield the corresponding $\alpha$-carbamoyl derivatives, viz, the 3-aryl-$\alpha$-carbamoyl-4,5,6,7-tetrahydro-$\Delta^{2,\alpha}$-benzothiazolineacetic acid lower alkyl esters of Formula VI. Treatment of the last-named compounds with 50–70 percent aqueous sulfuric acid eliminates the carbamoyl group and yields the corresponding 3-aryl-4,5,6,7-tetrahydro-$\Delta^{2,\alpha}$-benzothiazolineacetic acid lower alkyl esters of Formula VII. Those last-named compounds may also be obtained directly from the compounds of Formula V by treatment with 50–70 percent aqueous sulfuric acid.

The following examples and formulae in which $R^1$ and $R^2$ have the significance defined above will illustrate this invention.

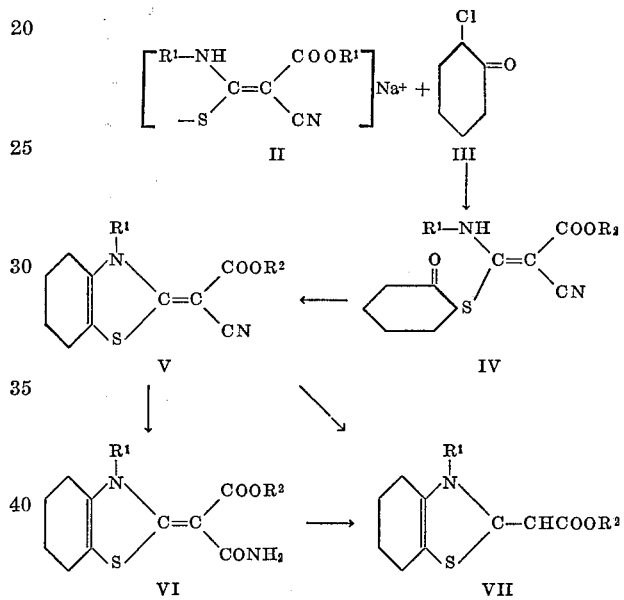

EXAMPLE 1

To a cold solution of sodium ethoxide (0.1 mole of sodium in 50 ml. of ethanol), 0.1 mole of ethyl cyanoacetate is added. The solution is cooled and 0.1 mole of phenyl isothiocyanate is added. The mixture is cooled for three minutes and left at room temperature for one hour. It is then poured into 250 ml. of water and acidified with 50% hydrochloric acid. The precipitate is filtered off and crystallized from ethanol, to yield 3-anilino-2-cyano-3-thioacrylic acid ethyl ester with M.P. 115–116° C.

In the same manner, but using 3-nitrophenyl, 4-chlorophenyl, or 3,4-dichlorophenyl isocyanate instead of phenyl isocyanate, the corresponding 3-(3'-nitrophenylamino)-, 3-(4'-chlorophenylamino)-, and 3-(3',4'-dichlorophenylamino) - 2 - cyano - 3 - thioacrylic acid ethyl esters, M.P. 128–129° C., are also obtained.

EXAMPLE 2

2-chlorocyclohexanone (3.9 g.) is added to a solution of 7.5 g. 3-anilino-2-cyano-3-thioacrylic acid ethyl ester and 0.69 g. of sodium metal in 100 ml. ethanol. The resulting solution is left at room temperature for 2 hours. After evaporating the ethanol the residue is dissolved in chloroform, washed with water, dried and the chloroform evaporated to yield 3 - anilino - 2 - cyano-3-(2'-oxocyclohexyl) thioacrylic acid ethyl ester which is crystallized from methanol to M.P. about 100° C.

In the same manner as described above, but using 3-(3'-nitrophenylamino)-, 3-(4'-chlorophenylamino)-, or 3-(3',4'-dichlorophenylamino)-2-cyano-3-thioacrylic acid ethyl ester as starting materials, the corresponding 3-(3'-nitrophenylamino)-, 3-(4'-chlorophenylamino)-, and 3-(3',4' - dichlorophenylamino) - 2 - cyano-3-(2'-oxocyclohexyl)-thioacrylic acid ethyl esters are also obtained.

EXAMPLE 3

2-chlorocyclohexanone (1.3 g.) is added to an ethanol solution of the sodium salt of 3-anilino-2-cyano-3-thioacrylic acid ethyl ester (2.5 g.). The reaction mixture is heated to reflux for 4 hours, cooled and the solvent evaporated. The residue is dissolved in chloroform, washed with water, dried over magnesium sulfate and the solvent evaporated to yield α-cyano-3-phenyl-4,5,6,7-tetrahydro-$\Delta^{2,\alpha}$-benzothiazolineacetic acid ethyl ester, M.P. 194° C. after crystallization from benzene - hexane and from methanol.

Similarly, 2-chlorocyclohexanone (1.0 g.) is added to an ethanol solution of the sodium salt of 3-(3',4'-dichlorophenylamino)-2-cyano-3-thioacrylic acid ethyl ester (2.25 g.) and the reaction mixture is refluxed for 24 hours. The residue obtained after evaporation of the solvent is dissolved in chloroform, washed with water and dried over sodium sulfate. Evaporation of the solvent yields α-cyano-3 - (3',4' - dichlorophenyl)-4,5,6,7-tetrahydro-$\Delta^{2,\alpha}$-benzothiazolineacetic acid ethyl ester with M.P. 183° C. after crystallization from ether and aqueous acetone.

Similarly, by using 3-(3'-nitrophenylamino)- or 3-(4'-chlorophenylamino)-2-cyano-3-thioacrylic acid ethyl ester as starting material and reacting with 2-chlorocyclohexanone as above, the corresponding 3-(3'-nitrophenyl)- and 3-(4' - chlorophenyl) - α - cyano - 4,5,6,7-tetrahydro-$\Delta^{2,\alpha}$-benzothiazolineacetic acid ethyl esters are also obtained.

EXAMPLE 4

α - Cyano - 3 - phenyl - 4,5,6,7 - tetrahydro - $\Delta^{2,\alpha}$-benzothiazolineacetic acid ethyl ester (7.2 g.) is dissolved in 15.0 ml. of concentrated sulfuric acid and allowed to stand at room temperature for four days. The solution is poured into ice and neutralized, with cooling, with 40% sodium hydroxide, extracted with chloroform, washed with water, dried and the chloroform evaporated to yield a yellow oil. Trituration with petroleum ether yields α-carbamoyl-3-phenyl-4,5,6,7-tetrahydro-$\Delta^{2\alpha}$-benzothiazolineacetic acid ethyl ester with M.P. 138–139° C. after crystallization from benzene.

In the same manner, but using 3-(3'-nitrophenyl)-, 3-(4' - chlorophenyl)-, or 3 - (3',4' - dichlorophenyl) - α-cyano - 4,5,6,7 - tetrahydro-$\Delta^{2,\alpha}$-benzothiazolineacetic acid ethyl esters as starting materials, the corresponding 3-(3'-nitrophenyl)-, 3-(4'-chlorophenyl)-, and 3-(3',4'dichlorophenyl) - α - carbamoyl - 4,5,6,7 - tetrahydro-$\Delta^{2\alpha}$-benzothiazolineacetic acid ethyl esters are also obtained.

EXAMPLE 5

A solution of 6.8 g. α-carbamoyl-3-phenyl-4,5,6,7-tetrahydro-$\Delta^{2,\alpha}$-benzothiazolineacetic acid ethyl ester in 100 ml. aqueous sulfuric acid (60%) is allowed to stand at room temperature for 30 hours, poured on ice, and extracted with chloroform. Evaporation of the chloroform solution and crystallization of the oily residue from benzene yields 3 - phenyl - 4,5,6,7 - tetrahydro-$\Delta^{2,\alpha}$-benzothiazolineacetic acid ethyl ester, M.P. 153–154° C.

In the same manner, but using 3-(3'-nitrophenyl)-3-(4'-chlorophenyl)-, or 3-(3',4'-dichlorophenyl)-α-carbamoyl-4,5,6,7 - tetrahydro-$\Delta^{2,\alpha}$-benzothiazolineacetic acid ethyl esters as starting materials there are obtained the corresponding 3-(3'-nitrophenyl)-, 3-(4'-chlorophenyl)-, and 3-(3',4'-dichlorophenyl)-4,5,6,7-tetrahydro-$\Delta^{2,\alpha}$-benzothiazolineacetic acid ethyl esters, respectively.

EXAMPLE 6

A solution of 6.5 g. of α-cyano-3-phenyl-4,5,6,7-tetrahydro-$\Delta^{2,\alpha}$-benzothiazolineacetic acid ethyl ester in 100 ml. aqueous sulfuric acid (60%) is left at room temperature for four days. The reaction mixture is poured on ice and extracted with chloroform. The oil resulting from the evaporation of chloroform is crystallized from benzene, to yield 3-phenyl-4,5,6,7-tetrahydro-$\Delta^{2,\alpha}$-benzothiazolineacetic acid ethyl ester, identical with the product described in Example 5.

In the same manner, but using 3-(3'-nitrophenyl)-, 3-(4' - chlorophenyl)-, or 3 - (3',4' - dichlorophenyl)-α-cyano-4,5,6,7 - tetrahydro-$\Delta^{2,\alpha}$-benzothiazolineacetic acid ethyl esters as starting materials, there are obtained the 3-(3'-nitrophenyl)-, 3-(4'-chlorophenyl)-, and 3-(3'-4'-dichlorophenyl)-4,5,6,7 - tetrahydro-$\Delta^{2,\alpha}$-benzothiazolineacetic acid ethyl esters, respectively, identical with the compounds described in Example 5.

EXAMPLE 7

In the same manner as described in Examples 1–6 inclusive, but using the corresponding methyl esters as starting materials, there are obtained 3-anilino-, 3-(3'-nitrophenylamino)-, 3-(4'-chlorophenylamino)-, and 3-(3',4'-dichlorophenylamino) - 2 - cyano-3-thioacrylic acid methyl esters and 3-(2'-oxocyclohexyl)-2-cyano-thioacrylic acid methyl esters, as well as 3-phenyl-, 3-(3'-nitrophenyl)-, 3-(4'-chlorophenyl)-, and 3-(3',4'-dichlorophenyl)-α-cyano- and α-carbamoyl-4,5,6,7-tetrahydro-$\Delta^{2,\alpha}$-benzothiazolineacetic acid methyl esters, and 3-phenyl-, 3-(3'-nitrophenyl)-, 3-(4'-chlorophenyl)- and 3-(3',4'-dichlorophenyl)-4,5,6,7 - tetrahydro-$\Delta^{2,\alpha}$-benzothiazolineacetic methyl esters, respectively.

I claim:

1. Compounds of the formula

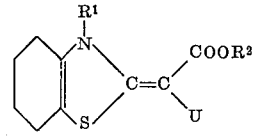

wherein $R^1$ is selected from the group which consists of phenyl, 3-nitrophenyl, 4-chlorophenyl and 3,4-dichlorophenyl; $R^2$ represents lower alkyl containing not over two carbon atoms; and U is a substituent selected from the group which consists of hydrogen and nitrile and carbamoyl groups.

2. α-Cyano-3-phenyl - 4,5,6,7 - tetrahydro-$\Delta^{2,\alpha}$-benzothiazolineacetic acid ethyl ester.

3. α-Cyano-3-(3',4'-dichlorophenyl)-4,5,6,7-tetrahydro-$\Delta^{2,\alpha}$-benzothiazolineacetic acid ethyl ester.

4. α-Carbamoyl-3-phenyl-4,5,6,7-tetrahydro-$\Delta^{2,\alpha}$-benzothiazolineacetic acid ethyl ester.

5. 3-phenyl-4,5,6,7 - tetrahydro-$\Delta^{2,\alpha}$benothiazolineacetic acid ethyl ester.

References Cited

UNITED STATES PATENTS 2,558,400  6/1951  Van De Straete _____ 260—304

NICHOLAS S. RIZZO, Primary Examiner

R. J. GALLAGHER, Assistant Examiner

U.S. Cl. X.R.

260—465; 424—270

UNITED STATES PATENT OFFICE
CERTIFICATE OF CORRECTION

Patent No. 3,462,449  Dated August 19, 1969

Inventor(s) Real Laliberte

It is certified that error appears in the above-identified patent and that said Letters Patent are hereby corrected as shown below:

In column 1, formula,

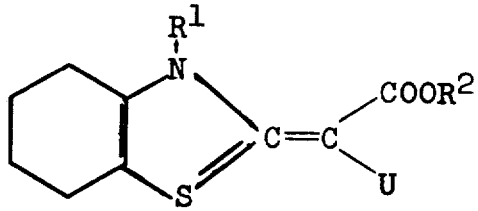

should read

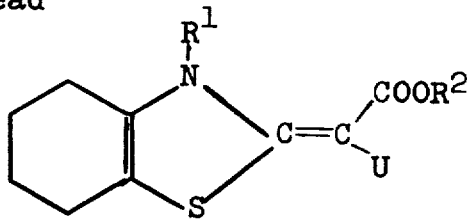

In column 4, claim 5, "benothiazolineacetic" should read --benzothiazolineacetic--.

SIGNED AND SEALED

DEC 30 1969

(SEAL)
Attest:

Edward M. Fletcher, Jr.
Attesting Officer

WILLIAM E. SCHUYLER, JR.
Commissioner of Patents